Oct. 26, 1948.          F. V. COLLINS                2,452,357
                 MANUFACTURE OF PLASTIC CONTAINERS
Filed March 12, 1947                              3 Sheets-Sheet 1

Inventor:
Fred V. Collins,
By Dawson, Booth & Spingarn,
Attorneys.

Oct. 26, 1948.  F. V. COLLINS  2,452,357
MANUFACTURE OF PLASTIC CONTAINERS
Filed March 12, 1947  3 Sheets-Sheet 2

Inventor:
Fred V. Collins,
By Dawson, Booth & Spangenberg,
Attorneys

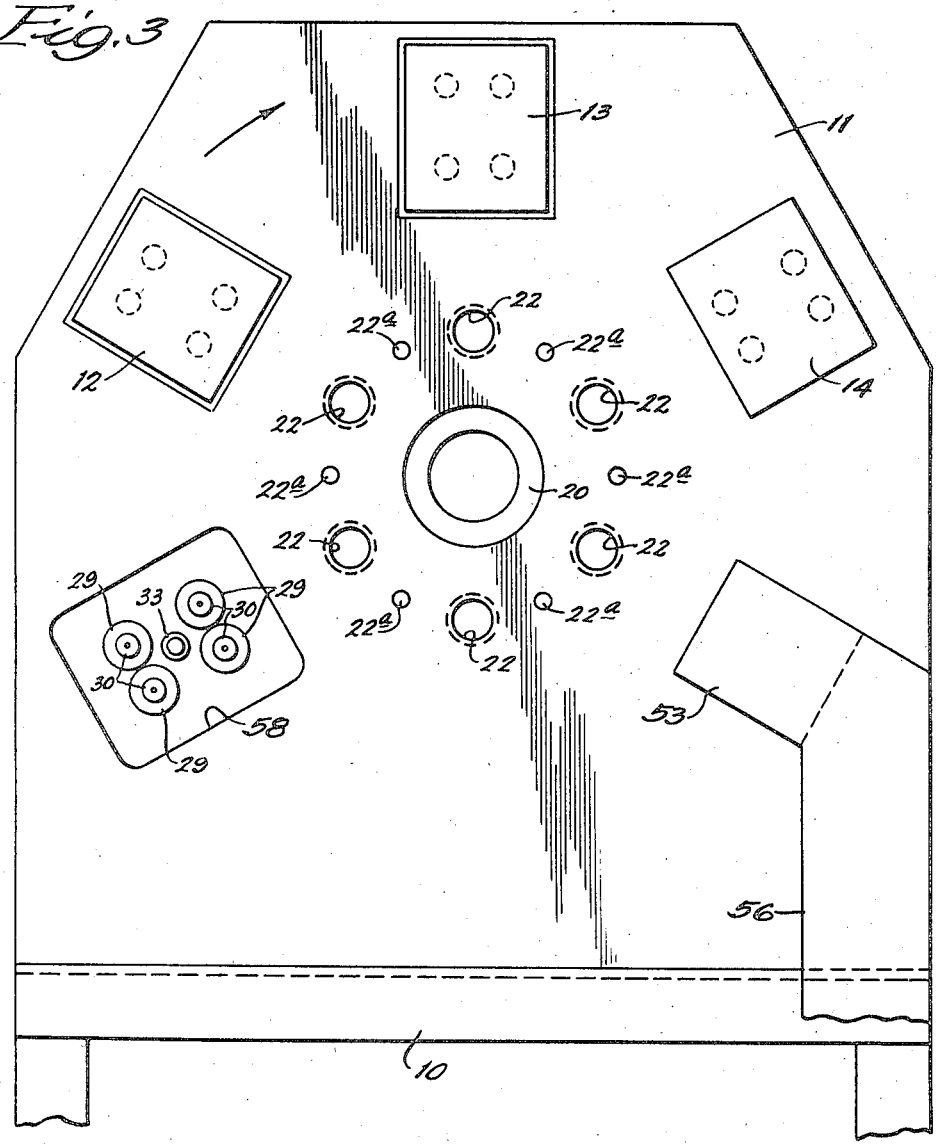

Patented Oct. 26, 1948

2,452,357

UNITED STATES PATENT OFFICE 2,452,357

MANUFACTURE OF PLASTIC CONTAINERS

Fred V. Collins, Des Plaines, Ill., assignor to William F. Stahl, Kenilworth, Ill.

Application March 12, 1947, Serial No. 734,068

16 Claims. (Cl. 154—1)

1

This invention relates to the manufacture of plastic containers. The invention is particularly useful in the forming of caps, containers, and similar products from tubular fusible stock.

Tubes are formed under present practice from plastic materials, such as cellulose acetate, vinyl acetate, vinyl chloride (copolymer), and from a variety of other materials of a fusible character by inexpensive methods and in great volume. If such available tubular products can be utilized in the forming of containers, bobbins, caps, and other products, a substantial reduction in the cost of such products can be produced, while at the same time furnishing an extremely sturdy and desirable product.

An object of the present invention is to provide a means and method for producing the products described above from such fusible tubes in conjunction with disks, etc. Yet another object is to provide apparatus which will subject the tubes to a sequence of operations whereby a well-formed junction between the tubes and a disk or cap is obtained. Yet another object is to provide continuous apparatus for integrating plastic tubes and disks so that the same are produced uniformly and in large volume. Other specific objects and advantages will appear as the specification proceeds.

The invention is illustrated, in a preferred embodiment, by the accompanying drawings, in which—

Figure 1:
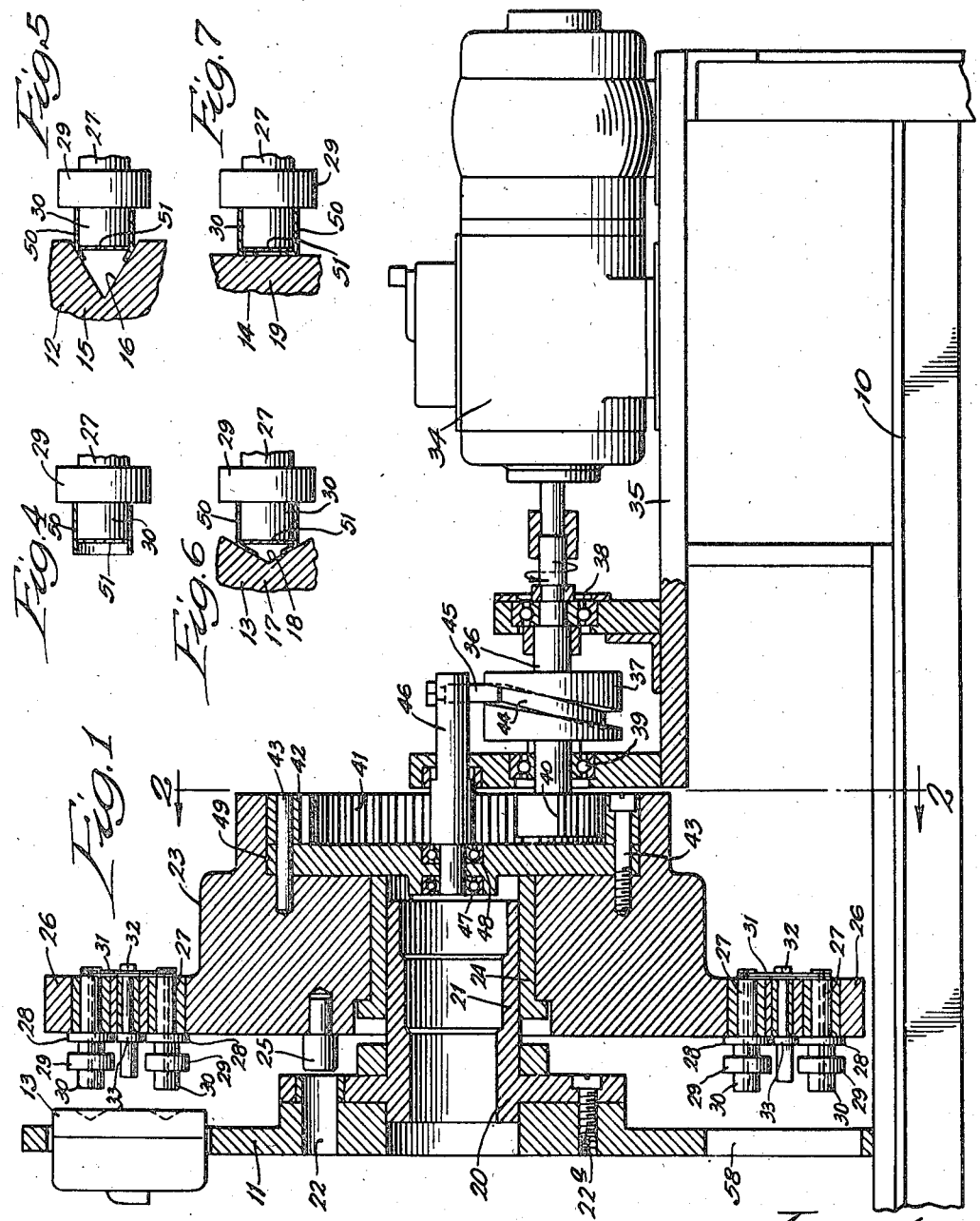
Figure 2:
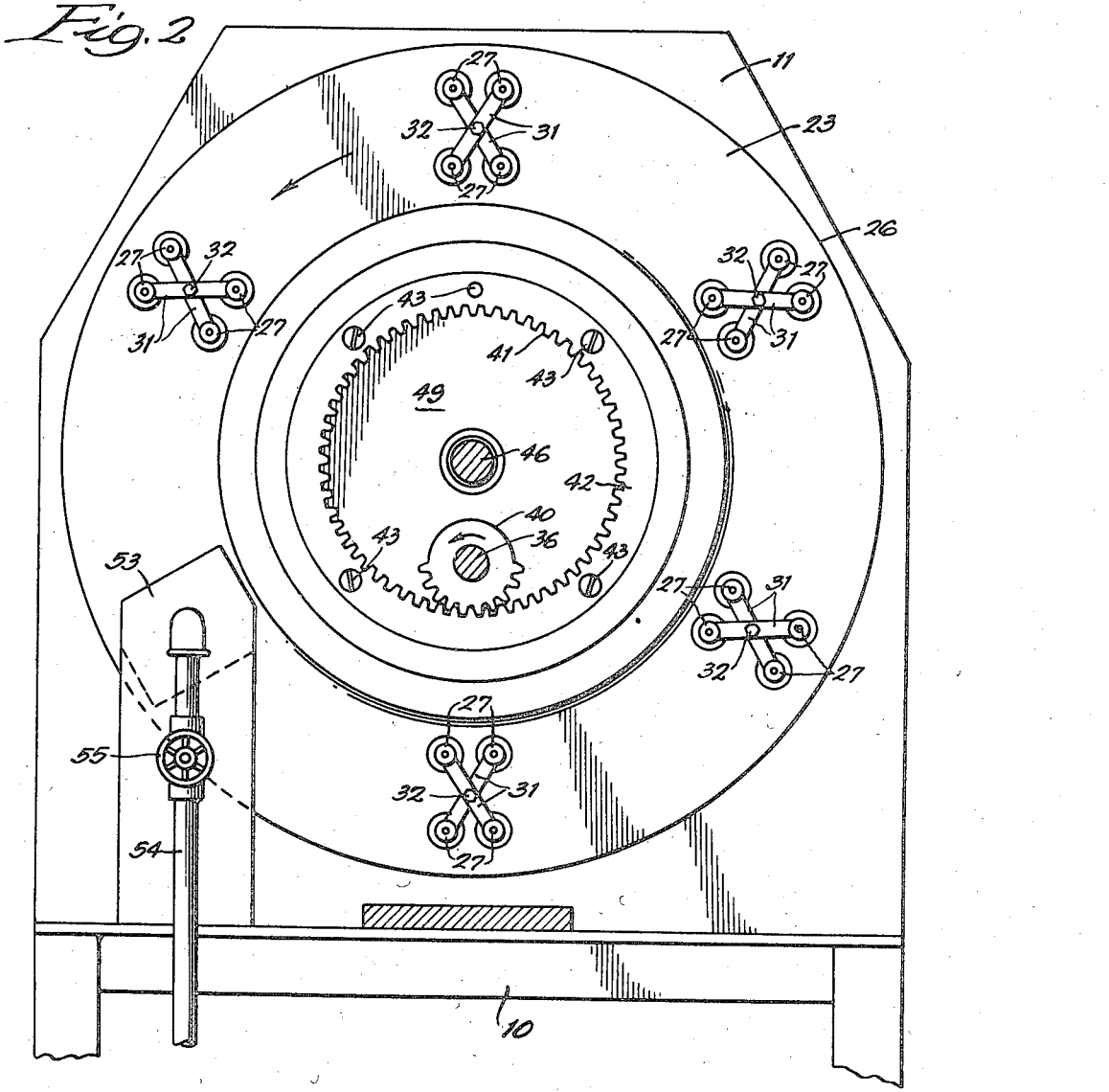

Figure 1 is a broken longitudinal sectional view of apparatus embodying my invention; Fig. 2, a transverse sectional view, the section being taken as indicated at line 2—2 of Fig. 1 and most of the apparatus being shown in rear elevation; Fig. 3, a front view in elevation of the die plate employed; Fig. 4, a broken side view in elevation of the mandrel employed showing the tube and disk thereon in section; Fig. 5, a view similar to Fig. 4 but showing the mandrel brought against a die for the bending inwardly of the tube end; Fig. 6, a view similar to Fig. 5 but showing a different die and a progressive inward turning of the tube end; Fig. 7, a view similar to Fig. 6 but showing the end of the tube in abutting relation with an electronic foot by means of which the disk and tube are subjected to high frequency radio waves for the fusion of the inturned tube end with the disk; and Fig. 8, a perspective view of the completed container, etc.

In the illustration given, 10 designates a frame which may be of any suitable form or construction. Fixed to the frame 10 by welding or by any other suitable means is a vertically-extend-

2 ing die plate 11. The die plate carries a plurality of dies 12 and 13 and also an electronic sealing device 14.

The die members 12 and 13 are similarly constructed so as to provide a heated die surface. The dies may be heated by electric resistance elements within the casings 12 or 13 or by any other suitable heating means. Each of the members 12 and 13 is provided with four individual die surfaces. The die plate 15 of the die structure 12 has rather sharply inclined wall recesses 16, as shown more clearly in Fig. 5, to start the inward inclination of tube walls. The die plate 17 of the die structure 13 has the less sharply inclined die walls 18, as shown more clearly in Fig. 6.

The electronic sealing device 14 is provided with an electronic foot 19 for the discharge of high frequency radio waves to bring about the fusion of the plastic disk and tube. A suitable connection with a high frequency radio wave generator is provided as described more fully in my co-pending application Serial No. 651,642 for Tube forming apparatus and method.

Bolted to the inner rear side of the die plate 11 is a bearing member 20 having an inwardly-extending tubular portion 21. The plate 11 and vertical flange of the member 20 are apertured at spaced intervals to provide alignment recesses 22, and the flange and plate are secured together by bolts 22a.

Rotatably and slidably mounted upon the tubular portion 21 of the member 20 is a presser plate 23. The presser plate is provided on its inner side with a tubular ring 24 resting upon the surface of the tubular member 21. Plate 21 carries a stabilizing pin 25 adapted to engage one of the recesses 22 when the plate 23 is moved toward the die plate 11. It will be understood that a larger number of pins 25 may be employed if desired.

The plate 23 is provided with a reduced peripheral portion 26 carrying in spaced relation thereon six sets of mandrels. Each set of mandrels comprises four. Each mandrel 27 extends through the plate portion 26 and is provided with a flange 28 engaging the forward face of plate 26. The mandrel is provided with an enlarged flange 29 at a spaced distance beyond the flange 28. The mandrel portion 30 extends forwardly of the flange 29 and is adapted to receive the plastic tube to be treated. Each of the four mandrels 27 within a set is provided with an annular groove at its rear to receive the looped end of a metal strap. Two metal straps 31 are arranged in cross relation, as shown best in Fig. 2, and a bolt 32 extends through the straps 31 at their central portions and thence forwardly through the plate section 26. A nut 33 engaging the forward threaded end of the bolt 32 secures the members 27 releasably in position.

Any suitable means for intermittently rotating the presser plate 23 and for advancing it to bring the mandrel portions 30 into engagement with the die members and the electronic sealing member may be employed. In the illustration given, I provide a motor 34 mounted upon the frame platform 35, and the motor drives a shaft 36 upon which a cylindrical cam 37 is mounted. The driven shaft 36 is supported on ball bearings 38 and 39. The forward end of driven shaft 36 is provided with a sector gear 40. The sector gear 40 meshes with the internal teeth 41 of the member 42 which is secured by bolts 43 to the presser plate 23.

The cam 37 is provided with an inclined groove 44 engaging a follower pin 45. The follower pin 45 is carried by shaft 46 which extends through the hollow internal gear member 42 and is connected by the antifriction bearings 47 and 48 to the plate 49 secured between the internal gear member 42 and plate 23.

The plastic tube to be placed upon a mandrel 30 is indicated by the numeral 50 and the disk to be secured to the tube is indicated by the numeral 51.

Any suitable means for removing the completed container, etc., from the mandrel 30 may be employed. I prefer to employ a compressed air device for ejecting the finished products. To facilitate this operation, I provide each of the mandrels 27 with a longitudinal passage 52 so that compressed air or other fluid may be passed through the passage to strike the finished product on the mandrel portion 30. As indicated more clearly in Figs. 2 and 3, a frame 53 is provided in position for alignment with each set of mandrels so as to form a compartment thereabout at the rear of each set. A pipe 54 communicates with the compartment and may be controlled by a valve 55. I prefer to employ an automatically-operated valve which will be opened when each set of mandrels becomes aligned with the ejecting chute 56. It will be understood that the finished containers, etc., can be removed in a large variety of ways and that any suitable means for accomplishing such removal may be employed.

Figure 8:
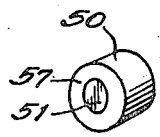

The finished product, comprising a tube 50 having its end portion turned inwardly to form a bottom flange 57 fused to the disk 51, is shown more clearly in Fig. 8.

The die plate 11 is provided with a feed slot 58, as shown more clearly in Figs. 1 and 3, through which access is had to a set of mandrels 37 for the feeding of tubes and disks thereon.

Operation

In the operation of the device, the motor 34 is set into operation, bringing about a rotation of driven shaft 36. Shaft 36 drives the segmental gear 40 which gives an intermittent rotation of member 42 and plate 23. The relative gearing of the segmental gear 40 and teeth 41 of the internal gear 42 is such that, upon a rotation of the gear 40, a set of mandrels is moved from one station to the next, that is from the feed opening 58 to die member 12, or from die member 12 to die member 13, or from die member 13 to the electronic seal 14. The next spaced station is the ejecting station provided by frame 53.

The partial rotation indicated brings the sets of mandrels into alignment with the respective stations indicated, and the presser plate is advanced toward the die plate 11. In the latter operation, the pin 25 provides a stabilizing means. Forward and rearward movement of the presser plate 23 is effected by the follower 45 engaging the cam groove 44 of cam 37. Relative movement between the shaft 46 and the plate 49 is provided by the bearings 47 and 48. It will be understood that the cam groove 44 may be modified to give any desired period of delay at the pressing interval or to produce the desired timing at the pressing operation.

The tubes 50 may be initially provided with the disks 51, and the operator may feed them upon a set of mandrel portions 30 when the same are exposed through the feed opening 58. If desired, the operator may feed the tube and disk separately upon the mandrel portion 30. The set of mandrels carrying the tubes and disks thereon are next moved to the die station 12 where the forward free end of the tube is slightly bent inwardly by the heated die recess 16, as indicated in Fig. 5. The partially-turned end is next brought to the die station 13 where it is bent further by contact with the die recess 18, as shown best in Fig. 6. The inwardly-folded end of the tube is next pressed flatly against the disk 51 at the electronic sealing station 14 and here a final fusion operation is completed, either by the application of heat and pressure, the heat being produced by high frequency radio waves, or by any other means.

The bending of the tube inwardly under the influence of pressure is an important step because the tube has to be narrowed in the bending operation. I find that excellent results are obtained by employing the two steps indicated in which a partial bending is formed at one station and a further bending at another station, the angle of the die surfaces being different at the two stations. By these operations, the tube end tends to flow under the influence of heat and the die surfaces and to form a fusion within itself, producing a fairly unitary inwardly-extending flange 57 which, by reason of the fusion or flow of material in the flange, provides a substantially flat inner surface lying against the disk 51 and which is effectively sealed thereto by fusion. If the end of the tube were merely folded in without such flowing action, a fluted or fanned surface would be produced which would tend to form air spaces or leak passages between the disk and the flange 57.

The completed product formed at station 14 is then ejected by the passage of compressed air or other fluid through pipe 54, chamber 53, and the passages 52 in the separate mandrels 27. The ejected containers fall downwardly through chute 56 to a point of recovery.

In the final fusing operation at station 14, any suitable means for generating the heat to bring about the fusion may be employed. In the use of the electronic foot 19 illustrated, a relatively wide range of frequencies may be employed, depending upon the type of material being united, its thickness, power factor, and dielectric strength, etc. I have used frequencies of 200 megacycles effectively in the uniting of cellulose acetate, vinyl acetate, etc., in the usual tube and disk thicknesses.

If desired, the dies 12 and 13 or either of them may be used as electrodes for subjecting the dielectric tube 50 to high frequency radio waves, the mandrel portion 30 serving as the other electrode. In this operation, the dies and mandrel remain cold while the dielectric itself is heated.

The operation is rapid and the change in the plastic structures being united is effected uniformly and efficiently. If desired, automatic feeding means may be employed instead of the manual means described.

While in the foregoing specification, I have set forth one structure in great detail for the purpose of illustrating one embodiment of my invention, it will be understood that such details may be varied widely by those skilled in the art without departing from the spirit of my invention.

I claim:

1. In apparatus for uniting a fusible plastic tube and disk to form a closed end tube, a frame, a conveyor mounted thereon, a plurality of spaced mandrels carried by said conveyor and adapted to receive said plastic tubes and disks, a plurality of dies, means for shaping said tubes by turning their ends inwardly through the movement of said mandrels into engagement with said dies, and means for uniting the shaped tube and disk on each mandrel by subjecting the same to the action of heat and pressure.

2. In apparatus for uniting a fusible plastic tube and disk to form a closed end tube, a frame, a conveyor mounted thereon, a plurality of spaced mandrels carried by said conveyor and adapted to receive said plastic tubes and disks, a plurality of dies, means for shaping said tubes by turning their ends inwardly through the movement of said mandrels into engagement with said dies, and means for uniting the shaped tube and disk on each mandrel by subjecting the same to the action of high frequency radio waves.

3. In apparatus for uniting a fusible plastic tube and disk to form a container, a frame, a die plate carried thereby and equipped with a plurality of dies in spaced relation, a presser plate equipped with mandrels adapted to receive thereon tubes provided with disks, means for rotating said presser plate intermittently to bring said mandrels successively into alignment with said dies, means for bringing said presser plate and die plate toward each other to press said tubes against said dies, and means for uniting said disk and shaped tube by subjecting the same to the action of heat.

4. In apparatus for uniting a fusible plastic tube and disk to form a container, a frame, a die plate carried thereby and equipped with a plurality of dies in spaced relation, a presser plate equipped with mandrels adapted to receive thereon tubes provided with disks, means for rotating said presser plate intermittently to bring said mandrels successively into alignment with said dies, means for bringing said presser plate and die plate toward each other to press said tubes against said dies, and means for uniting said disk and shaped tube by subjecting the same to the action of high frequency radio waves.

5. In apparatus of the character set forth, a frame, a fixed die plate carrying a plurality of dies in spaced relation, a presser plate rotatably and slidably mounted, mandrels carried by said presser plate in spaced relation and adapted to be aligned with said dies on said die plate, said mandrels being adapted to receive tubes having free ends extending beyond the mandrels and disks within the mandrels, means for intermittently rotating said presser plate into positions aligned with said dies and for advancing said presser plate to bring the tubes on said mandrels into engagement with said dies, said dies being provided with recesses for folding the tube end inwardly upon said disk, and means for heat-sealing the inwardly-folded tube edge against said disk while on said mandrel.

6. In apparatus of the character set forth, a frame, a fixed die plate carrying a plurality of dies in spaced relation, a presser plate rotatably and slidably mounted, mandrels carried by said presser plate in spaced relation and adapted to be aligned with said dies on said die plate, said mandrels being adapted to receive tubes having free ends extending beyond the mandrels and disks within the mandrels, means for intermittently rotating said presser plate into positions aligned with said dies and for advancing said presser plate to bring the tubes on said mandrels into engagement with said dies, said dies being provided with recesses for folding the tube end inwardly upon said disk, means for heat-sealing the inwardly-folded tube edge against said disk while on said mandrel, and means for ejecting said united tube and disk.

7. In apparatus for uniting thermoplastic tubes and disks, a frame, a die plate fixed thereto and equipped with a plurality of dies in spaced relation, a presser plate rotatably and slidably mounted and equipped with mandrels adapted to receive thereon tubes and disks, power means for intermittently rotating said presser plate and for intermittently advancing said presser plate to bring the tubes thereof into engagement with said dies and to turn inwardly the forward ends of said tubes, means for heating said dies, and means for uniting said inwardly-turned tube ends and disks by subjecting the same to heat and pressure.

8. In apparatus for uniting thermoplastic tubes and disks, a frame, a die plate fixed thereto and equipped with a plurality of dies in spaced relation, a presser plate rotatably and slidably mounted and equipped with mandrels adapted to receive thereon tubes and disks, power means for intermittently rotating said presser plate and for intermittently advancing said presser plate to bring the tubes thereof into engagement with said dies and to turn inwardly the forward ends of said tubes, means for heating said dies, and means for uniting said inwardly-turned tube ends and disks by subjecting the same to high frequency radio waves.

9. In apparatus of the character set forth, a rotatably mounted plate, mandrels carried thereby, said mandrels being provided with longitudinal passages extending therethrough, means for rotating said plate intermittently, said mandrels having an outer flange-equipped portion adapted to receive thereon a portion of a tube with a disk in the tube, means for turning the tube inwardly and fusing the same with said disk, a pressure fluid chamber arranged for alignment with at least one of said mandrels, and means for delivering pressure fluid into said chamber to cause the same to flow through the passage mandrel and eject the united tube and disk.

10. In apparatus of the character set forth, a frame, a die plate equipped with die and heat-sealing stations, said plate having an aperture extending therethrough, a presser plate rotatably and slidably mounted and having a plurality of sets of mandrels secured thereto, said sets being in spaced relation and each set being accessible at intervals through said opening in said die plate, means for rotating said presser plate to bring the mandrels thereof successively into alignment with said die and sealing stations, and means for advancing said presser plate toward said die plate to cause said mandrels to carry material to be united toward said dies and sealing members.

11. The structure of claim 10 in which an internal gear is driven by a segmental gear and in which a shaft is rotatably connected to said gear, said shaft being reciprocated by common rotating means connected to said segmental gear.

12. The structure of claim 10 in which a motor-driven shaft drives a grooved cam and segmental gear, the segmental gear engaging an internal gear fixed to said presser plate and in which a shaft rotatably connected to said presser plate is equipped with follower means engaging said groove for reciprocating said presser plate.

13. In apparatus for uniting a thermoplastic tube and disk, a frame, a die plate fixed thereto and equipped with a plurality of spaced dies, a presser plate equipped with mandrels adapted to receive thereon tubes and disks, with the tubes extending beyond the mandrels, a stabilizing plunger carried by said presser plate and engageable with spaced openings in said die plate, means for rotating said presser plate intermittently to bring said mandrels into alignment with said dies, means for advancing said presser plate to press said tubes against said dies, said dies having recesses therein of different pitches for turning the ends of the tube inwardly, means for heating said dies, and means for uniting said inwardly-turned flange and the disk by subjecting the same to heat and pressure.

14. In apparatus for uniting a thermoplastic tube and disk, a frame, a die plate fixed thereto and equipped with a plurality of spaced dies, a presser plate equipped with mandrels adapted to receive thereon tubes and disks, with the tubes extending beyond the mandrels, a stabilizing plunger carried by said presser plate and engageable with spaced openings in said die plate, means for rotating said presser plate intermittently to bring said mandrels into alignment with said dies, means for advancing said presser plate to press said tubes against said dies, said dies having recesses therein of different pitches for turning the ends of the tube inwardly, means for heating said dies, and means for uniting said inwardly-turned flange and the the disk by subjecting the same to the action of high frequency radio waves.

15. In apparatus for uniting a fusible dielectric plastic tube and disk to form a closed-end tube, a frame, a conveyor mounted thereon, a plurality of spaced mandrels carried by said conveyor and adapted to support said plastic tubes and disks, a die having a recess for shaping the end of a tube, means for subjecting the tube to the action of high frequency radio waves while in contact with said die, and means for subjecting the shaped tube and disk to heat to fuse the same together.

16. In apparatus for uniting a fusible dielectric plastic tube and disk to form a closed-end tube, a frame, a conveyor mounted thereon, a plurality of spaced mandrels carried by said conveyor and adapted to support said plastic tubes and disks, a die having a recess for shaping the end of a tube, means for subjecting the tube to the action of high frequency radio waves while in contact with said die, and means for subjecting the shaped tube with the disk therein to the action of high frequency radio waves to fuse the tube and disk.

FRED V. COLLINS.

REFERENCES CITED

The following references are of record in the file of this patent:

UNITED STATES PATENTS

| Number | Name | Date |
|---|---|---|
| 1,537,697 | Roberts | May 12, 1925 |
| 1,855,216 | Bennett | Apr. 26, 1932 |
| 1,904,239 | Johnson | Apr. 18, 1933 |
| 2,169,315 | Yngve | Aug. 15, 1939 |
| 2,324,068 | Crandell | July 13, 1943 |